No. 775,541. PATENTED NOV. 22, 1904.
J. A. McCONNELL.
PIPE COVERING AND PROCESS OF MAKING SAME.
APPLICATION FILED AUG. 4, 1900. RENEWED FEB. 12, 1903.
NO MODEL. 2 SHEETS—SHEET 1.
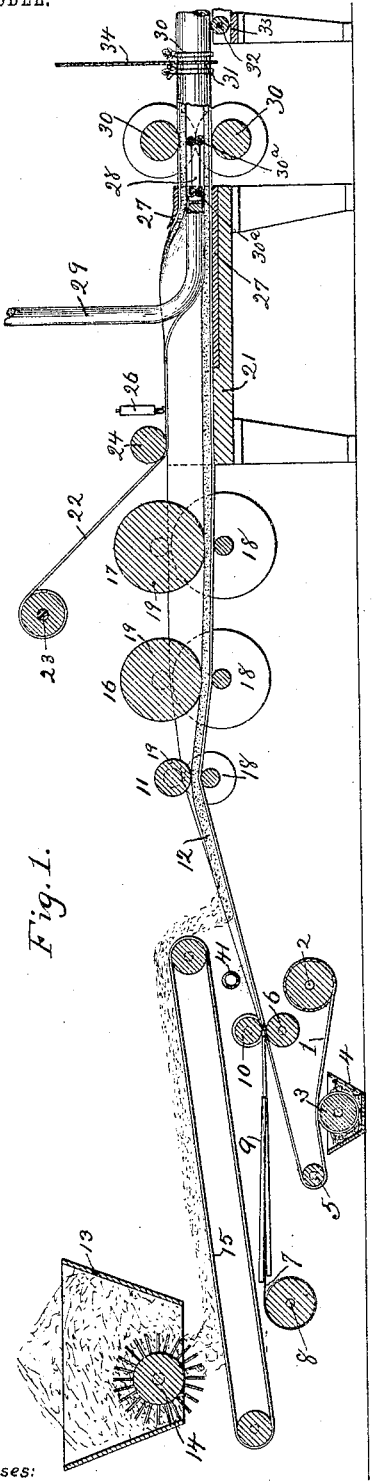
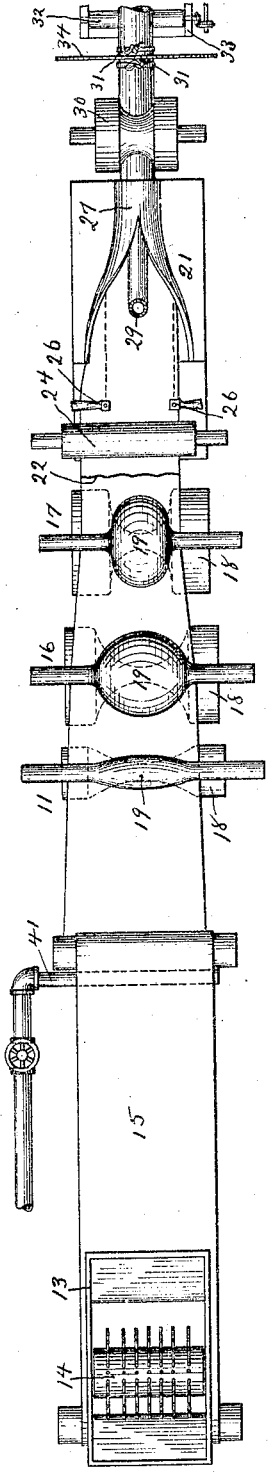
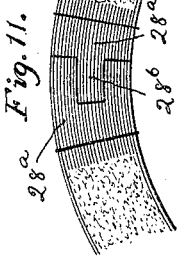
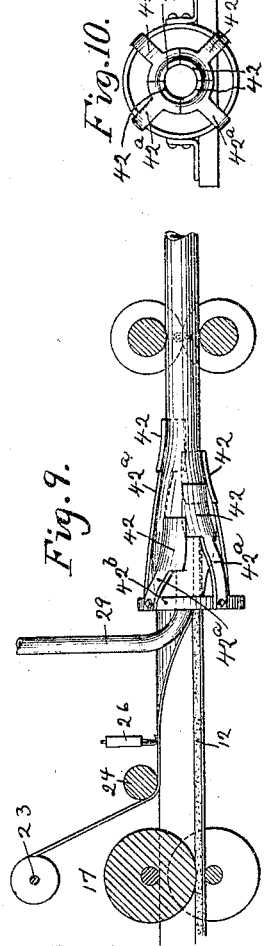
Witnesses:
Inventor:
John A. McConnell
By Kay & Totten
Attorneys.

No. 775,541. PATENTED NOV. 22, 1904.
J. A. McCONNELL.
PIPE COVERING AND PROCESS OF MAKING SAME.
APPLICATION FILED AUG. 4, 1900. RENEWED FEB. 12, 1903.
NO MODEL. 2 SHEETS—SHEET 2.
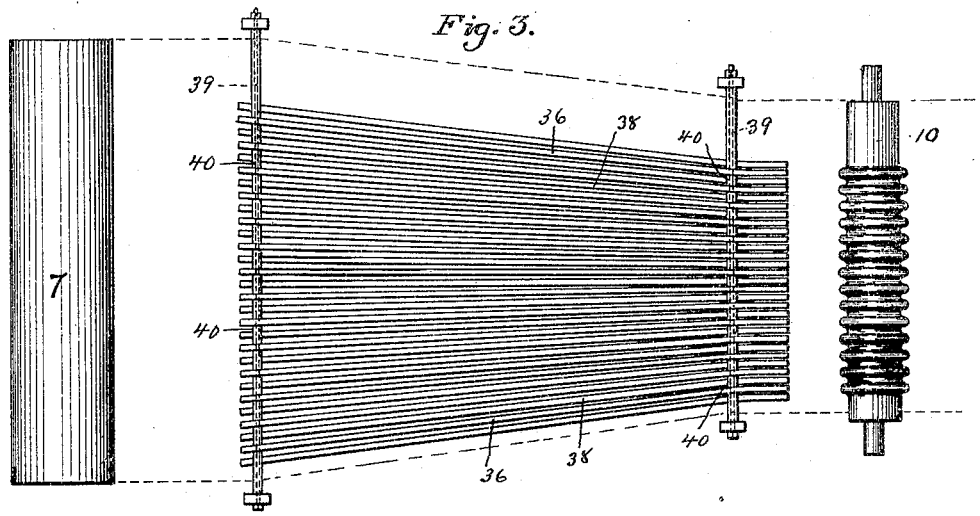
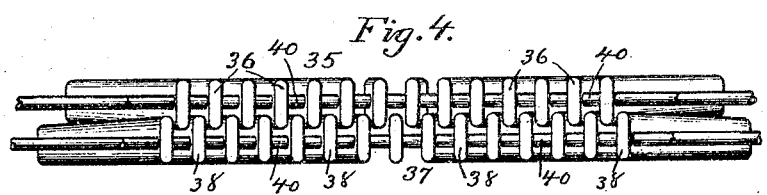
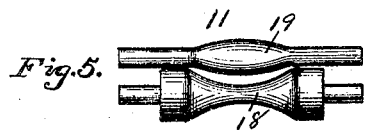
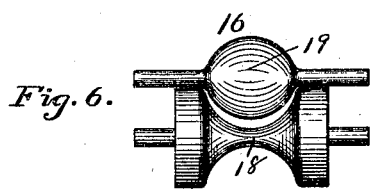
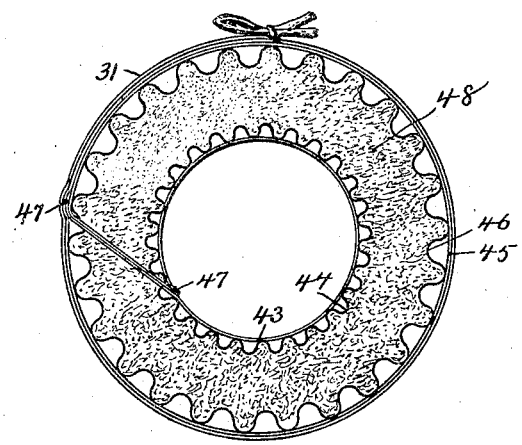
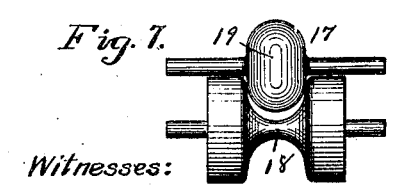
Witnesses:
Walter Fairweather
Allan W. Foose
Inventor:
John A. McConnell
By Kay & Totten
Attorneys.

No. 775,541.                                   Patented November 22, 1904.

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

PIPE-COVERING AND PROCESS OF MAKING SAME.

SPECIFICATION forming part of Letters Patent No. 775,541, dated November 22, 1904.

Application filed August 4, 1900. Renewed February 12, 1903. Serial No. 143,146. (No model.)

*To all whom it may concern:*

Be it known that I, JOHN A. McCONNELL, a resident of Allegheny, in the county of Allegheny and State of Pennsylvania, have invented a new and useful Improvement in Pipe-Coverings and Processes of Making Same; and I do hereby declare the following to be a full, clear, and exact description thereof.

My invention relates to a non-conducting covering for steam-pipes, refrigerator-pipes, boilers, &c., and to the process of making the same.

The particular form of non-conducting covering to which my invention relates is one comprising a body of fibrous or granular material—such as hair, asbestos fiber, mineral wool, plastic magnesia, or similar fibrous or granular material—interposed between two binding strips or sheets. Heretofore in the manufacture of this class of non-conducting coverings it has been the custom to build up by hand the mass of fibrous or granular material and binding-sheets in sections about three feet long, and when the desired thickness was built up it was then wrapped around a mandrel to give it the desired form, after which it was removed from the mandrel. This was a very slow and tedious process, so that with the most improved devices heretofore used it has not been practicable by the common hand process for two persons to make more than three hundred feet per day of these soft fibrous coverings for small-sized pipes and a very much less quantity of covering for larger-sized pipes.

It is the object of my invention to overcome these defects in the old process of manufacturing soft fibrous non-conducting coverings and to provide a process which is practically continuous and uninterrupted, so that the output is very largely increased, and also to provide a covering of the character specified so constructed that the soft fibrous materials are held in place and prevented from sagging toward the lower side of the pipe or other body on which the same are placed.

To these ends my invention consists in taking a long strip of paper, felt, asbestos, or other suitable material, placing thereupon a layer of fibrous or granular material which is to serve as a filling and then laying upon both another strip of paper, felt, asbestos, or similar material, drawing the same along continuously and forming the same into a tube, and then severing the tube into suitable sections. The process is carried on practically without interruption, the various parts of the mechanism employed being so arranged that no stoppage is necessary.

To enable others to practice and use my invention, I will describe the same more fully, referring to the accompanying drawings, in which—

Figure 1 is a longitudinal section of an apparatus suitable for carrying out my process. Fig. 2 is a plan view of the same. Fig. 3 is a diagrammatic plan view of the corrugating or fluting mechanism. Fig. 4 is an end view of the same. Figs. 5, 6, and 7 are front views of the three sets of bending-rolls employed. Fig. 8 is a transverse section of the finished tubular covering. Fig. 9 is a longitudinal sectional view showing a modified form of bending die or bell. Fig. 10 is an end view of the same, and Fig. 11 is a detail view illustrating a modified form of covering.

In the preferred form of my invention I have shown the covering consisting of binding sheets or strips formed of corrugated or fluted paper, and I will describe the same as applied to such form of covering; but it will be understood that the binding strips or sheets may be of plain paper, felt, or asbestos, and in the latter case the corrugating mechanism will be omitted.

As shown in Fig. 1, a sheet 1 of paper, felt, or asbestos is placed upon a suitable roller 2, from which it is drawn over a roller 3, which runs in a paste-box 4, whereby one surface of said sheet is covered with paste, said sheet thence passing over a guide-roller 5 and over a plain-faced roller 6. A similar sheet 7 of paper or similar material is placed upon a roller 8, from which it is drawn between the corrugating or fluting bars or fingers 9 and passed under a fluted roller 10, the said fluted roller 10 being directly above the plain-faced roller 6, so that the corrugated or fluted sheet is pressed into contact with the upper surface of the sheet 1, to which paste has been applied, whereby said sheets are pasted or glued together. The united sheets of paper thence pass to the pair of rolls 11; but before reaching the same a layer of fibrous or granular material 12 is applied to the upper face thereof. The fibrous or granular material is placed in a hopper 13, from whence it is removed by means of a picker or other suitable spreading mechanism 14 and dropped upon an endless belt 15, by means of which it is conveyed to and deposited upon the combined sheets 1 and 7 in a uniform layer, thinned at the two longitudinal edges. The combined sheet, with the superimposed layer of fibrous or granular material, thence passes in succession through the pairs of rollers 11, 16, and 17. Each of said pairs of rollers comprises a lower roll 18, cut away at its center, and an upper roll 19, enlarged at its center, the cut-away portions of the lower rolls and the enlarged portions of the upper rolls gradually increasing in degree in the three pairs of rollers 11, 16, and 17 in succession, so that said rollers gradually bend the combined sheets and layer of fibrous or granular material into a trough or U shape. The form and size of the pair of rolls 17 are such as to make the U-shaped body of covering slightly larger than the circumference of the cylindrical mandrel around which the same is to be formed. The object of this is to provide for the overlapping or interlocking of the edges of the sheets when they are fully brought into tubular form. As the material thus formed emerges from the pair of rollers 17 the edges thereof are led along the upper edges of the sides of a trough formed on the table 21. At this point another sheet or strip of paper 22, preferably corrugated, is led from a roller 23 down underneath a guide-roller 24 and into contact with the combined sheets and filling material above described. This upper sheet is narrower than the lower sheet, and the edges of the upper and lower sheets are suitably secured together, as by means of stitching, stapling, or pasting. I have shown a sewing-machine diagrammatically at 26 for uniting the edges of the sheets. The mass of material is then drawn forward through the bending die or bell 27, by means of which it is coiled into tubular form around the mandrel 28, placed in said bell or former. The upper sheet 22 forms the inner circumference of the tube, and by reason of its being narrower than the lower sheet it forms a smooth inner surface and does not pucker or crease, as it would do if it were of the same width. I may, however, make said upper sheet of the same width as the lower sheet and suitably crease it longitudinally, so that when folded into tubular form the creases will overlap and form a plaiting. In such case I so place the roll 23, Fig. 1, as to lay the upper sheet on the combined lower sheet and filling material before the same pass between the rollers 11 and 18.

Instead of making the entire inner filling of soft fibrous material I may fill the central part therewith and along each side build up out of line with each other narrow strips $28^a$ of paper or other similar material, as shown in Fig. 11, and in that way form upon my improved soft fibrous covering overlapping or interlocking joints $28^b$, or tongue-and-groove, V, U, W, or L shape, or any desired interlocking out-of-line joint, as shown, described, and claimed by me in an application of even date herewith, Serial No. 25,907.

The bell or die 27 may be an open flaring one, as shown, or may be funnel-shaped, or it may even be a mere ring. The mandrel 28 is shown as of the round or ball type and is supported by means of an arm 29, secured to the ceiling or any other suitable place. In front of the bell 27 are placed a pair of grooved rollers 30, between which the tube is given its final shape. The mandrel 28 projects forward and lies in the bite of the rollers 30, and in order to decrease friction said mandrel is supplied both within the bite of the rollers 30 and within the narrowest part of the bell or die 27 with two or more revolving elliptical or barrel shaped rollers $30^a$, as will be readily understood. When the formed tube emerges from the grooved rollers 30, I place thereabout bands 31 of cloth, preferably cotton tape, said bands being supplied with paste or glue, so that they become permanently attached to the covering, although they may be sewed or otherwise permanently attached to the lower or outer binding-sheet before it is placed in position. These bands or tapes are applied at suitable intervals, preferably about one foot apart, and are temporarily tied, so that the tube is held in shape until it fully sets. When the tube is put in place on the steam-pipe or other body, these bands or tapes are used to permanently secure the same firmly in place, and inasmuch as they do not rust nor are attacked by insects they form a strong and permanent tie for the non-conducting covering, so that the covering is not liable to drop off the pipe or have its seams spring open to permit the escape of heat or admit cold. The formed tube passes from the rollers 30 to a series of rollers 32 on a table 33 and is then cut into suitable sections. I prefer to cut it into sections by means of the swinging and traveling saw 34, said saw being mounted so that it can be moved across the path of the tube and will travel along with the tube and at the same rate as the latter and can then be moved away from the tube and back to its original position, so that it will cut the tube squarely across into sections without the necessity of stopping the machine. If preferred, however, the tube may be run out to suitable length—say thirty or forty feet—and cut off and this length then cut by means of a handsaw or any other suitable device into the desired sections of three, six, or more feet, as desired.

In Figs. 3 and 4 I have illustrated the means for corrugating or fluting the paper sheets, and this means consists of an upper frame or grating 35, comprising a series of bars or fingers which gradually approach each other at their forward ends and a lower frame or grating 37, comprising a series of similar bars 38, which likewise gradually approach each other at their forward ends. The rear ends of the bars of said frames are placed slightly apart, so that the paper can be led in between the same; but the forward ends of the bars of one frame lie between the forward ends of the bars of the other frame, said bars approaching each other at the same rate and in the same proportion that the sheet is narrowed by the taking up of the material in forming the corrugations, so that as the sheet of paper is drawn through said bars it is gradually corrugated or fluted, as will be readily understood. The bars of the several frames are secured together by rods or bolts 39 and are spaced apart a suitable distance by sleeves 40, as will be readily understood. The front ends of the bars or fingers are preferably parallel with each other for a few inches to properly form the corrugations; but this is not absolutely necessary, as the corrugated roller 10 will perform the function of the parallel portions of the fingers.

If preferred, the sheet of corrugated paper 7 need not be supplied with the holding-sheet 1; but in that case some provision must be made to give said corrugated sheet a permanent set. This is best accomplished by moistening the same and then allowing it to dry while corrugated, thereby stiffening it or giving it a permanent set. Inasmuch, however, as dry paper or similar material is much stronger than moistened paper, it can be much more easily and quickly worked in its dry state. I therefore first corrugate the sheet and then moisten it, thereby securing the quick working of the same and also all of the benefits that may be derived from moistening it and allowing it to dry. The sheet of paper or similar material, therefore, after being corrugated and passed between the rollers 6 and 10 is suitably moistened, as by means of a spray of water coming from a pipe 41, and is then allowed to dry while retained in its corrugated form, whereby it is given a permanent set. For many purposes this stiffening is very desirable, even when the plain sheet is fastened upon the corrugated one.

In Figs. 9 and 10 I have illustrated a modified form of bell or bending-die, the same being made up of four sections 42, each of said sections comprising a quadrant and said sections being placed about ninety degrees removed from the center of each other and each one slightly in advance of the preceding, so that the material or mass to be bent into tubular form is gradually bent into said form. The first section or quadrant of the die-rolls in the edge which is to form the inner edge of the tubular covering and the other sections further roll the same into tubular form, and the last section rolls or bends down the outer edge of the material upon the previously-coiled mass. Each of these sections or quadrants is supported by a suitable arm $42^a$, said arms being secured to a ring $42^b$ or other suitable support. The same forms of mandrel are used with this form of bell or die as with the other form of bell.

In Fig. 8 is shown a sectional view of a form of covering produced by my process, and in the specific form illustrated it consists of an inner sheet 43, having applied thereto a corrugated sheet 44, an outer sheet 45, having applied thereto a corrugated sheet 46, said inner and outer sheets having their edges secured together, as at 47, and a mass of fibrous or granular material inclosed between said sheets, as at 48. The whole is surrounded and secured by means of the tapes 31, above described. When these soft fibrous materials are bound between smooth inner and outer sheets as heretofore made, the fibrous mass sags downward, and when placed upon steam pipes or boilers the vibration caused by the jarring of steam under pressure increases this trouble, so that the covering is soon thinned on the top of the pipe where it is most needed. In my covering, however, the soft fibrous material is compressed into the depressions of the fluted or corrugated binding-sheets, and the latter grip the fiber and hold it securely in place and prevent it from sagging. Furthermore, the fibrous or granular material is laid upon the lower binding-sheet in a layer of uniform thickness, so that when the binding-sheets and filling material are bent into tubular form the covering will have no thinned spots, but will be of the same thickness throughout, thereby preventing the escape of heat at any point. In making the form of covering shown in Fig. 8 the layer of filling material is thinned at the two longitudinal edges; but the main body thereof is of uniform thickness. The thinned longitudinal edges form a bevel edge to the combined sheets and filling material, so that when the same is bent into tubular form a proper lap-joint, such as shown in Fig. 8, is formed, the bevels of the meeting edges so overlapping that the combined thickness of the two edges is equal to the thickness of the other portion of the tube. It will thus be seen that in both forms of covering the layer of fibrous or granular filling material is free from longitudinal or other thinned portions, so that when bent into tubular form the walls of the tube are of the same thickness throughout.

By the expression in the claims "a layer of uniform thickness" I mean a layer which is not provided with longitudinal or other thinned portions in the body thereof, but do not mean to exclude the mere thinning of the longitudinal edges of the layer, so as to provide for a proper lap-joint.

It is readily apparent that my improved process is practically a continuous one, it being possible to form coverings of the entire length of the strips or sheets of paper used without stopping the machine, so that there is practically no loss of time in the various operations performed. At the same time the tubular covering is provided with a lapped or interlocking joint, thereby preventing the escape of heat to a greater extent than with a butt-joint.

What I claim, and desire to secure by Letters Patent, is—

1. The method of making non-conducting coverings, which consists in taking a strip of fibrous non-conducting material, spreading thereupon a layer of uniform thickness of loose non-conducting filling material, placing over the same another strip of fibrous non-conducting material, and then drawing the combined strips and filling material longitudinally, and progressively and continuously bending the same into tubular form having walls of uniform thickness.

2. The method of making non-conducting coverings, which consists in taking a strip of fibrous non-conducting material, spreading thereupon a layer of uniform thickness of loose non-conducting filling material, placing over the same another strip of fibrous non-conducting material, suitably uniting the edges of the two strips, and then drawing the combined strips and filling material longitudinally, and progressively and continuously bending the same into tubular form having walls of uniform thickness.

3. The method of making non-conducting coverings, which consists in taking a strip of fibrous non-conducting material, spreading thereupon a layer of uniform thickness of loose non-conducting filling material, placing over the same another strip of fibrous non-conducting material, drawing the combined strips and filling material longitudinally, and progressively and continuously bending the same into tubular form having walls of uniform thickness, and then cutting the tube into sections.

4. The method of making non-conducting coverings, which consists in taking a strip of fibrous non-conducting material, spreading thereupon a layer of uniform thickness of loose non-conducting filling material, placing over the same another strip of fibrous non-conducting material, bending the combined strips and filling material into tubular form having walls of uniform thickness, and attaching cloth bands to the formed tube and securing the same to hold the tube in shape.

5. The method of making non-conducting coverings, which consists in taking a strip of fibrous non-conducting material, spreading thereupon a layer of uniform thickness of loose non-conducting filling material, placing over the same another strip of fibrous non-conducting material, bending the combined strips and filling material into trough shape, uniting the edges of the strips, and then bending the whole into tubular form.

6. The method of making non-conducting coverings, which consists in taking a strip of fibrous non-conducting material, corrugating the same, spreading thereupon a layer of uniform thickness of loose non-conducting filling material, placing over the same another strip of fibrous non-conducting material, and then drawing the combined strips and filling material longitudinally, and progressively and continuously bending the same into tubular or other suitable form.

7. The method of making non-conducting coverings, which consists in taking a strip of fibrous non-conducting material, corrugating the same, applying a flat strip to the lower surface thereof, spreading on the upper surface thereof a layer of uniform thickness of loose non-conducting material, and then drawing the combined strips and filling material longitudinally, and progressively and continuously bending the same into tubular or other suitable form.

8. The method of making non-conducting coverings, which consists in taking a strip of fibrous non-conducting material, spreading thereupon a layer of uniform thickness of loose non-conducting filling material, gradually bending the same into trough shape, placing over the same another strip of fibrous non-conducting material, uniting the edges of the strips, and then bending the whole into tubular form.

9. The method of making non-conducting coverings, which consists in taking a strip of fibrous non-conducting material, spreading thereupon a layer of uniform thickness of loose non-conducting filling material, progressively and continuously bending the same by rolling pressure into trough shape, placing over the same another strip of fibrous non-conducting material, uniting the edges of the strips, and then bending the whole into tubular form.

10. The method of making non-conducting coverings, which consists in taking a strip of paper, corrugating the same, then dampening the same so that when dry it will set the corrugations, spreading thereupon a layer of loose non-conducting filling material, placing over the same another strip of paper, and then bending the combined strips and filling material into tubular or other suitable form.

11. A tubular non-conducting covering comprising inner and outer binding-sheets of fibrous non-conducting material, one or both of which are corrugated, said sheets being united at their edges, and a filling of loose non-conducting material between them.

12. A tubular non-conducting covering comprising inner and outer binding-sheets of fibrous non-conducting material united at their edges, a filling of loose non-conducting material between them, and cloth bands attached to said tubular covering for fastening the same.

13. A tubular non-conducting covering comprising inner and outer binding-sheets of fibrous non-conducting material, said sheets being flat or corrugated, a filling of loose non-conducting material therebetween, and cloth bands permanently attached at intervals to said covering for securing the same in place.

In testimony whereof I, the said JOHN A. McCONNELL, have hereunto set my hand.

JOHN A. McCONNELL.

Witnesses:
F. W. WINTER,
ROBERT C. TOTTEN.